United States Patent
Walker et al.

(10) Patent No.: US 8,866,769 B2
(45) Date of Patent: Oct. 21, 2014

(54) DEVICE COVER WITH DRAWING PAD INPUT DEVICE

(75) Inventors: David Ryan Walker, Waterloo (CA); Steven Henry Fyke, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 214 days.

(21) Appl. No.: 13/418,440

(22) Filed: Mar. 13, 2012

(65) Prior Publication Data
US 2013/0241839 A1  Sep. 19, 2013

(51) Int. Cl.
G06F 3/041 (2006.01)
G06F 3/0488 (2013.01)

(52) U.S. Cl.
CPC .................................. *G06F 3/0488* (2013.01)
USPC ......................................................... 345/173

(58) Field of Classification Search
None
See application file for complete search history.

(56) References Cited

U.S. PATENT DOCUMENTS

| | | | |
|---|---|---|---|
| 5,467,407 A | 11/1995 | Guberman et al. | |
| 5,570,110 A | 10/1996 | Shiga et al. | |
| 8,583,174 B2 * | 11/2013 | Wu et al. | 455/556.1 |
| 2002/0064308 A1 | 5/2002 | Altman et al. | |
| 2002/0101705 A1 | 8/2002 | Genest et al. | |
| 2003/0064751 A1 | 4/2003 | Charlier et al. | |
| 2003/0089781 A1 | 5/2003 | Kia et al. | |
| 2003/0090462 A1 | 5/2003 | Lapstun et al. | |
| 2005/0195447 A1 | 9/2005 | Os | |
| 2005/0231746 A1 | 10/2005 | Parry et al. | |
| 2006/0007189 A1 | 1/2006 | Gaines, III et al. | |
| 2007/0268267 A1 | 11/2007 | Chang | |
| 2008/0246975 A1 | 10/2008 | Poxon et al. | |
| 2009/0128865 A1 | 5/2009 | Kuchibhotla et al. | |
| 2010/0088439 A1 | 4/2010 | Ang et al. | |
| 2010/0177036 A1 * | 7/2010 | Nam | 345/156 |
| 2011/0302530 A1 | 12/2011 | Harris et al. | |

FOREIGN PATENT DOCUMENTS

| | | |
|---|---|---|
| GB | 2316300 | 2/1998 |
| WO | 2008133410 | 11/2008 |

OTHER PUBLICATIONS

EESR dated Aug. 16, 2012 for EP 12159314.

* cited by examiner

*Primary Examiner* — Joseph Haley
(74) *Attorney, Agent, or Firm* — Jeffrey N. Giunta; Fleit Gibbons Gutman Bongini & Bianco PL

(57) ABSTRACT

A cover for an electronic device and associated method. A case body has an outer and an inner surface, the inner surface defines at least part of a case compartment that receives an electronic device. A drawing pad is attached to the case body and has a touch sensitive input region, which senses drawing gestures thereon, and a detachable data communications interface that detachably connects a communications link to the electronic device. The communications link conveys indication data corresponding to sensed drawing gestures to the electronic device.

18 Claims, 8 Drawing Sheets

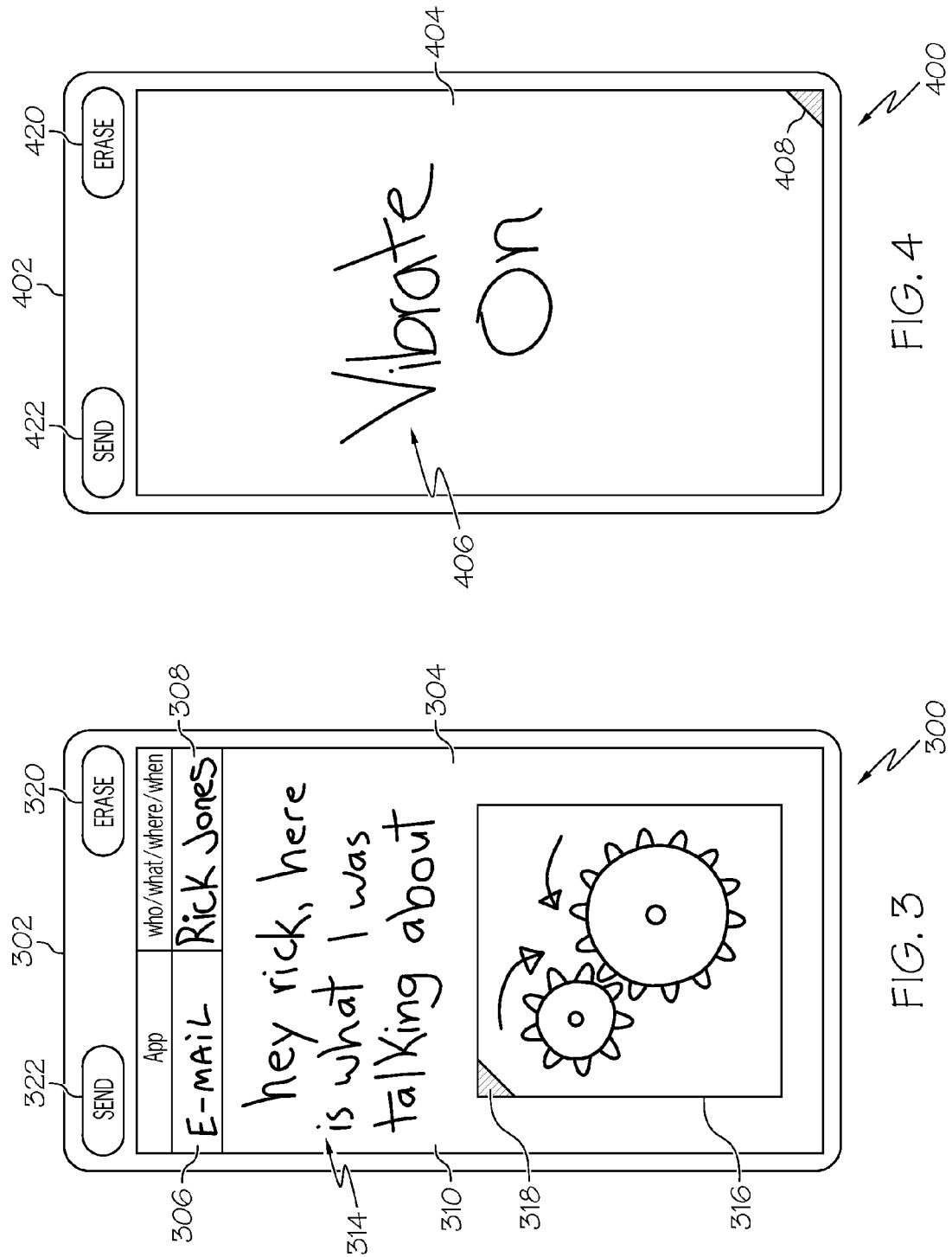

DEVICE COVER WITH DRAWING PAD INPUT DEVICE

FIELD OF THE DISCLOSURE

The present disclosure generally relates to electronic device covers and user interface devices, and more particularly to electronic device covers that incorporate drawing pad input devices.

BACKGROUND

Portable electronic devices, such as portable telephones, laptop and tablet computers, are often carried in an enclosure such as a protective or decorative case or other carrying solution. One function of such an enclosure is to protect the device from surface scratches or other damage caused by objects that come into contact with the device.

Portable electronic devices that are carried in an enclosure for protection or other reasons are, however, more difficult for a user to access for usage. This difficulty has a greater impact when the user wishes to use the portable electronic device for a quick task. Users often have a desire to quickly write down various text information or images, a task which is easily accomplished with a pen or paper. A user may like to quickly jot down a sketch or write a note for later retrieval, but will avoid doing so with an electronic device due to the inconvenience of having to retrieve the device's carrying case or other carrying solution, and then handle the carrying case to withdraw the electronic device for use. Once the electronic device is taken out of the case, the user must turn it on, launch on app, and perhaps perform other tasks. This sequence of events lacks the convenience of a typical experience of jotting down a note with pen and paper It has also been observed that the touch sensors used in many electronic device touch screens do not well support drawing images through stylus based input or finger sketching. These touch sensors sometimes have a low input resolution, particular on larger screens. The difficulty of using conventional touch screen inputs for stylus or finger sketching of images is a further impediment to a user's use of the portable electronic device to capture sketches or make handwritten notes.

Therefore, the usefulness of portable electronic devices is reduced due to the inconvenience of having to remove the device from a carrying solution and by difficulty in using their touch screens for stylus or finger sketching.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 illustrates a drawing pad with indicated input regions, in accordance with one example;

FIG. 4 illustrates a drawing pad entered electronic device configuration command, in accordance with one example.

DETAILED DESCRIPTION

Figure 1:
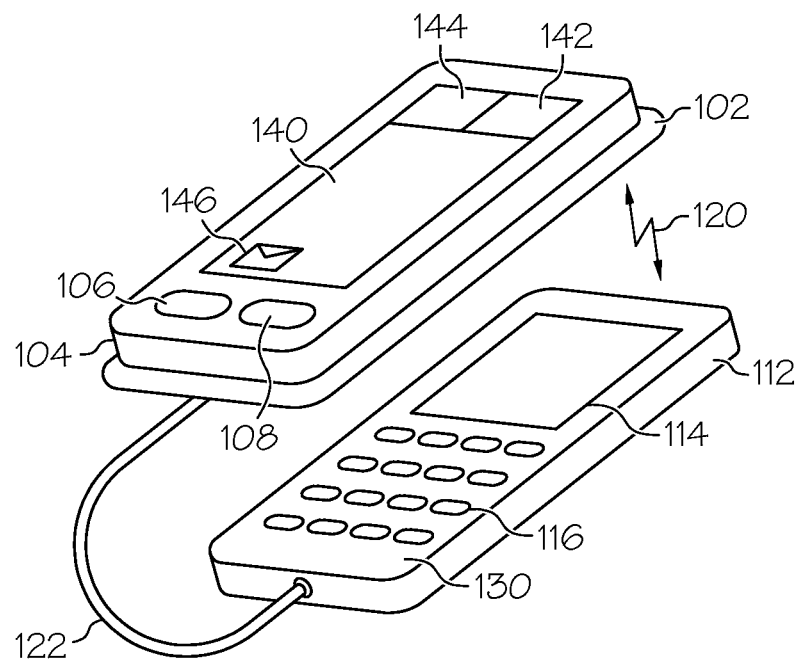
FIG. 1 depicts a an electronic device with drawing pad cover, according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function Described below are apparatuses and methods that combine an external drawing pad with a portable electronic device to facilitate easy entry of data into the portable electronic device. The below described apparatuses and methods are particularly useful in allowing a user to quickly and easily enter data, commands, or both, into the portable electronic device when the control components, such as keys or a touch-screen, of the electronic device are not easily accessible, such as when the portable electronic device is stored in a case or other type of compartment.

As an example, when a user wants to quickly jot down notes or sketches similar to the familiar methods used with a pen and paper, the user is able to enter the sketch or information on an electronic device, such as a laptop computer, tablet computer or smartphone, by using a separate drawing pad that is external to the electronic device. The drawing pad of one example described below is designed to incorporate touch sensors that are better adapted to capturing sketches as opposed to simply locating the location of a touching action as is the objective of may touch screen devices. It has been observed that the touch sensors used in many electronic device touch screens do not well support stylus based input or finger sketching. These touch sensors sometimes have a low input position resolution, particularly in the case of larger screens.

The below described apparatuses and methods allow the separate drawing pad to be placed on the outside of a device's carrying case or other enclosure. Placing the drawing pad on the outside of the electronic device's carrying case allows quick and convenient access to the drawing pad to quickly enter sketches or other hand written information. This obviates the need to remove the electronic device from the carrying case or other carrying solution to enter the sketch by drawing on the input screen of the electronic device. Further, the apparatuses and methods described below obviate the user's requirement to turn on the electronic device, manipulate its human-machine interface to launch the required application, and perhaps to perform other tasks before being able to make the desired drawing. Allowing quick entry and capture of handwritten inputs returns to the user the convenience of the familiar pen and paper with the power of electronic device processing of the captured image.

The examples below describe using a low power consumption drawing pad as a secondary input for a portable electronic device. This low power drawing pad is able to be integrated as part of a mobile device carrying solution. The drawing pads described below that are used in conjunction with portable electronic devices incorporate drawing pads with touch input technologies that have higher resolution to more effectively support stylus and finger input than might be found in a common portable electronic device. These drawing pads are further able to exhibit slim profiles and lower power consumption than is consumed by the touch screen inputs of portable electronic devices.

In one example, the drawing pad operates to capture handwritten inputs independently from the operation of the portable electronic device that will receive data describing the handwritten input. In one example, the drawing pad has an "erase" button and a "send" button to control the accumulation of handwritten input. A user is able to draw on a touch sensitive input region of the drawing pad and create sketches or write handwritten text. The user is also able to make impressions on the touch sensitive input region of the drawing pad to create particular images or sketches. The user is able to simply erase all of the accumulated drawing input defining the sketch by pressing the erase button. The user is also able to send a set of data to the portable electronic device that describes all of the accumulated drawing input of his or her sketch that was made on the drawing pad by pressing the send button on the drawing pad. In one example, pressing the send button causes data describing the sketches on the drawing pad to a portable electronic device. That portable electronic device, in turn, processes the description of the handwritten sketches or text and responds accordingly.

Processing of the data describing the user's sketch by the portable electronic device include, for example, sending the content of the sketch to another person by an e-mail or messing service communications, storing information in a personal contact database or a notepad database, interpret the sketch as a handwritten command to change a configuration parameter of the portable electronic device, interpret the sketch as a handwritten command to set an appointment time in a calendar application, or any other processing.

In one example, the solutions described below include: 1) capturing hand drawn or other touch imposed images with a drawing pad that is separate from the electronic device used to process the inputted information; 2) directly sending data describing the captured hand-drawn or other touch imposed images from the drawing pad to a portable electronic device such as a tablet or smartphone; and 3) parsing the data received from the drawing pad that describes the hand-drawn or other touch imposed images. The parsing of the received data is able to, for example, recognize text or interpret commands. Parsing of this data is also able to recognize specialized symbol or provide location specific input.

In some examples, the drawing pad is integrated into a carrying case or other carrying solution for the portable electronic device. In further examples, the drawing pad itself forms a part of the carrying case and is able to, for example, provide a cover over the touch screen of the portable electronic device that is placed into the carrying case. These examples provide the user with an effective handwritten input device for an electronic device that is able to be used while the electronic device is stored. The drawing pad of some examples further serves as a protective element for the electronic device. Some of the features of the below described examples include: 1) using an input device that is not an active display for the electronic device and that only serves as an input mechanism; 2) the handwritten contents of the drawing pad are only sent to the electronic device as an entire image when the "send" button is pressed; and 3) the electronic device receiving the data describing the handwritten image interprets the image, the drawing pad only accumulates and conveys the image.

FIG. 1 depicts an electronic device with drawing pad cover 100, according to one example. The electronic device with drawing pad cover 100 includes electronic device 112 which is depicted as an enclosure body for the electronic device. The electronic device has a front surface 130 with various components that are protected by a protective cover 102. In the example depicted for the electronic device with drawing pad cover 100, the front surface 130 of the electronic device 112 has various human interface components, such as a display 114 and a keypad 116. The protective cover 102 is also depicted in the electronic device with drawing pad cover 100 as being positioned over the front surface 130. In order to more clearly present the components in this illustration, the protective cover 102 is depicted at a location above the front surface 130 of the electronic device 112. In general use, the protective cover 102 is placed close to or in contact with the front surface 130 to protect the front surface from damage due to contact with other objects. As is known by users of electronic devices, objects coming into contact with portions of an enclosure are able to scratch or otherwise damage the enclosure or components mounted thereon. In one example, the protective cover 102 is placed over the front surface 130 of the electronic device 112 in order to protect the screen of the display 114 from scratches and possible damage to the keypad 116 from objects coming into contact with those components.

The protective cover 102 has an outer surface and a drawing pad 104 fixedly attached thereto. The drawing pad 104 in one example has a touch sensitive input region 140. The touch sensitive input region 140 in various examples is able to detect pressure from a user's fingers, from other objects touching points on the touch sensitive input region, or is otherwise able to detect contact with the touch sensitive input region. The touch sensitive input region 140 in one example accepts user inputs by sensing contact with its surface. In addition to accepting inputs, in one example, the touch sensitive input region 140 are able to respond to contact by changing color at the location of the touch. This is similar to writing with a pen or pencil on a sheet of paper or on another surface.

Examples of a touch sensitive input region 140 include a Liquid Crystal Display (LCD) that has sensors to detect touching or other indications on the touch sensitive input region 140. Such LCD displays are able to appear as a white background color on which dots or lines drawn in a foreground color to portray images. In various examples, the foreground color is able to be black or any color. In further examples, the LCD display has a black background color on which white or other color foreground colors are drawn. As a user draws on the touch sensitive input region 140 with an object, the path is traced in one example by the dots at the location of contact changing from the background color to the foreground color.

In operation, any contact by an object with the touch sensitive input region 140 is referred to as a drawing gesture. Drawing gestures include contacts with the touch sensitive input region 140 where the contacting object either moves or does not move relative to the touch sensitive input region 140. In some examples, moving the object while it is in contact with the touch sensitive input region 140 is able to be recognized as a particular drawing gesture that has particular significance. An additional example of a drawing gesture is tracing out written text on the touch sensitive input region 140. Graphical images, such as artistic drawings, mechanical drawings, electrical circuits, or other graphical or combinations of graphical and textual images, are able to be drawn on the touch sensitive input region 140.

Drawing gestures are able to be made by contacting the touch sensitive input region 140 with a wide variety of objects. One example is using a finger to touch or draw on the touch sensitive input region 140. Other objects are able to be used to touch or draw on the touch sensitive input region 140, such as pens, various stylus type objects, and the like. As described in further detail below, stamps that comprise a texture defining an image or pattern can be pressed onto the touch sensitive input region 140 to create a stamp gesture that corresponds to that image or pattern.

Touch sensitive input regions in various examples are able to use different techniques to sense drawing gestures. For example, a touch sensitive input region 140 is able to be covered with a number of transparent electrical sensors that are able to detect the presence, location, and possibly applied pressure of an object's contact. Optical sensors that include optical transmitter and receiver pairs disposed along the edges of the touch sensitive input region 140 are also able to sense drawing gestures.

The illustrated touch sensitive input region 140 is shown to have three indicated input regions, a first indicated input region 142, and a second indicated input region 144, and an icon 146. The first indicated input region 142 and the second indicated input region 144 are regions of the touch sensitive input region 140 that are able to be associated with a designated function. In such a case, drawing gestures made within such an indicated input region are used as an input to the function associated with that indicated input region. As an example, the first indicated input region 142 is able to be associated with a function of selecting an application to which input is to be provided. In that example, drawing gestures made in the first indicated input region 142 are interpreted to identify which application is to receive input. In one example, the input provided to the identified application is sensed drawing gestures that were made in other areas of the touch sensitive input region.

The icon 146 shown on the touch sensitive input region 140 is a graphical representation that indicates a function. In this example, the icon 146 is an image of an envelope. In operation, a user is able to make a gesture over the icon 146 to select sending an e-mail message. Examples of gestures made over the icon 146 include a strike through, an "X," or a fill gesture. A fill gesture is a gesture that is made by moving an object across various portions of an area so that many locations in the area are contacted. In an analogy of writing on paper, an example of a fill gesture is using a pen or pencil to fill in a box or other area. A fill gesture is able to be sensed that does not completely fill an indicated area, but that generally contacts many points in the area.

The protective cover 102 is depicted to further have two user input buttons, a first user input button 106 and a second user input button 108. These two user input buttons are each an example of a user input element. The each user input button is configured to be pressed, or otherwise activated, by a user to cause an action to occur. Examples of user input buttons are an "erase" user input button and a "send" user input button. In an example, a user's pressing an "erase" user input button causes all of the pixels in the touch sensitive drawing area to return to their background color. A user's pressing the "send" user input button in one example of a user activation of a user input element that causes indication data corresponding to gestures drawn on the touch sensitive input region 140 to be sent to another device, as is described below.

The drawing pad 104 has at least one detachable data communications interface that connects a respective communications line between the drawing pad and the electronic device 112. In various examples, the communications link is able to be a wireless data link 120 or a wired data link 122. Examples of a wireless data link include short range wireless data links such as data links conforming to a Bluetooth® or similar standard. Examples of wired data links include data links that conform to a Universal Serial Bus (USB) or similar standard. These example data links are provided for illustration and any suitable data link is able to be used to communicate data from the drawing pad 104 to the electronic device 112. In one example, such a data link conveys a sequence of indication data that represents, for example, sensed drawing gestures made on the touch sensitive input region 140.

The electronic device 112 is configured to accept the sequence of indication data and analyze the received sequence of indication data to identify and determine data, commands, or both, that are represented by the drawing gestures represented by the receive sequence of indicated data. As described below, a processor within the electronic device 112 processes the received sequence of indication data that represents drawing gestures made on the touch sensitive input region to determine data or commands indicated by those drawing gestures. The processor within the electronic device 112 is further able to perform a function based on the data or commands determined based upon the sequence of indication data. Examples of processing performed by the processor within the electronic device 112 to extract the data and commands, and the functions that are able to be performed, include extracting configuration commands for the electronic device 112, extracting text and information to create e-mails or other messages to be sent by the electronic device 112, extracting information to store in the electronic device 112, such as personal contact data, or extract text or graphical data for other purposes.

Figure 2:
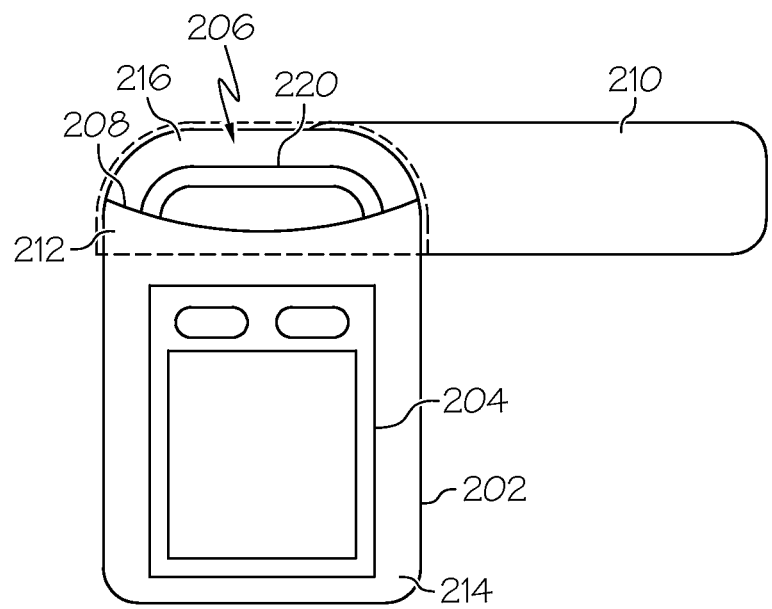
FIG. 2 illustrates an electronic device case with drawing pad, according to one example.

FIG. 2 illustrates an electronic device case with drawing pad 200, according to one example. The electronic device case with drawing pad 200 is depicts a case 202 that has a drawing pad 204 attached thereto. The case 202 is similar to familiar carrying cases used for electronic devices. Case 202 is used, for example, to protect an electronic device, such as a wireless communications device, a portable computer, a portable data processor, and the like. In some examples, the case 202 is used to protect a smartphone, a tablet computing device, or a laptop computer.

The illustrated case 202 is an "envelope" style case that has an outer surface 214 and an inner surface 216. The outer surface 214 is the outside of the material from which the case 202 is formed, and the inner surface 216 is the inside of that material which defines a case compartment 206. The case compartment 206 is a space into which an electronic device 220, or other object, is able to be removably received, or otherwise inserted, into the case for protection. The case 202 in one example fixedly defines five sides of the case compartment 206 into which the electronic device 220 is able to be inserted. The case 202 further defines an opening 208, which is along a sixth side of the electronic device 220. The opening 208, as depicted in this example, exists along most or all of the top edge of the case 202. The opening 208 allows the electronic device 220 to be inserted into the case compartment 206, and withdrawn from the case compartment.

In the illustrated example, the case 202 has a flap 210 that is movable between an open position (as is shown) and a closed position 212. When the flap is in the open position, the electronic device is able to be inserted into or removed from the case compartment 206. The flap 210 is able to be moved into a closed position so as to cover the opening 208. When the flap 210 is closed and is covering the opening 208, the electronic device or other object placed within the case compartment 206 is not able to be withdrawn or to fall out of the case. In various examples, the flap 210 is able to be secured into the closed position 212 by various devices, such as Velcro, zippers, snaps, or any securing mechanisms.

In some examples, a case 202 does not include a flap 210. A case 202 without a flap 210 is able to retain electronic devices or other objects within the case compartment 206 by various techniques. For example, a zipper, snaps or other securing devices are able to be placed on the case material in the vicinity of the opening 208, and those devices are able to secure the opening such that objects within the case compartment 206 are not able to be withdrawn or fall out. In a further example, non-slip material is able to line part or all of the in the case compartment 206 to cause the electronic device 220 to remain in the compartment and not easily fall out. Various other techniques are able to be used The outer surface 214 of the case 202 has a drawing pad 204 fixedly attached thereon. The drawing pad 204 is similar to the drawing pad 104 discussed above. As discussed above, the drawing pad 204 is able to have a detachable communications interface (not shown in FIG. 2) that connects a communications link between the drawing pad 204 and the electronic device 220. The communications link between the drawing pad 204 and the electronic device 220 is able to include a wireless data link or a wired data link. A wired data link is able to include a detachable electrical connector (not shown) mounted at a suitable location in the case compartment 206. The detachable electrical connector is able to form a detachable electrical circuit between the drawing pad 204 and the electronic device. In one example, inserting a suitably configured electronic device 220 into the case compartment 206 will cause the detachable electrical connector to engage a matching connector on the electronic device 220 and complete the electrical circuit between the drawing pad 204 and the electronic device 220.

A drawing pad 204 that is mounted on the outer surface 214 of the case 202 provides a user with a convenient input device to enter data into the electronic device 220 when the electronic device is stored within the closed case. In one example, a user is able to enter handwritten information on the drawing pad and cause that handwritten information to be transferred to the electronic device 220. One use for this configuration is entering quick notes, such as a telephone number or other contact data for a person to whom the user is talking. Another use is writing quick messages to be sent by a selected communications medium, such as e-mail, a selected text messaging service, or other medium. As discussed above, indicated input regions are able to be included on the drawing pad 204 to allow a user to identify the use of data entered on the drawing pad. For example, a user is able to write the text "e-mail" into an "application" input box, and an addressee into an "addressee" input box, and handwritten data entered in other areas of the drawing pad 204 is e-mailed to the addressee when the user presses a "send" input button. In a similar example, an icon for "e-mail" is able to be drawn on the drawing pad surface and a fill gesture is able to be drawn over that icon to indicate e-mailing the user drawn data on the drawing pad 204.

FIGS. 3 through 6 below depict examples of uses of a drawing pad that is mounted on an outer surface of a case. With reference to FIG. 2, the depicted screens in the following illustrated uses correspond to the drawing pad 204. In the below described uses, the drawing pad 204 has a communications link with an electronic device stored within the case 202. The below described drawings correspond to handwritten inputs in the form of drawing gestures that are provided by a user on the drawing pad 204, and the drawing pad 204 generates indication data that describes the drawing gestures drawn by the user on the drawing pad 204. As discussed above, the case 202 encloses the electronic device 220 so that the electronic device is protected but also to available to the user. Because the drawing pad 204 is located on the outer surface 214 of the case 202 that contains the electronic device 220, a user is able to easily enter the below described inputs on the drawing pad 204, and those inputs are conveyed to the electronic device for processing and disposition.

FIG. 3 illustrates a drawing pad with indicated input regions 300, in accordance with one example. The drawing pad with indicated input regions depicts a drawing pad 302 with a touch sensitive input region 304 that has a first indicated input region 306 and a second indicated input region 308. The first indicated input region 306 has a label "App" indicating that a user is able to specify an "application" that is to process the data entered on other areas of the touch sensitive input region 304. The second indicated input region 308 has a label "who/what/where/when" indicating that data entered into that indicated input region is to be processed by the application as an indication of the disposition of the data entered onto other areas of the touch sensitive input region 304.

In the illustrated example, the user has written "E-MAIL" into the first indicated input region 306, indicating that other data entered into the touch sensitive input region 304 is to be processed by an e-mail application. Other messaging applications are able to be specified according to the desires of the users and applications available on the electronic device to which the drawing pad 302 is connected.

The user has written "Rick Jones" into the second indicated input region 308. In the context of the "E-MAIL" app indicated in the first indicated input region 306, the entry in the second indicated input region 308 is the addressee of the e-mail message to be sent. In other scenarios, the data entered into the second indicated input region 308 is able to have a different connotation. For example, entering "CONTACT" into the first indicated input region 306 might indicate that a contact manager is to process the entered data. In that scenario, the data entered into the second indicated input region 308 indicates the name of the person for whom contact information is being entered. The other data entered on the touch sensitive input region 304 then indicates the contact information for that person.

The area of the touch sensitive input region 304 that is not indicated as a special area is referred to as a general input region 310 of the touch sensitive input region 304. In this example, the general input region 310 contains a graphic drawing 312 and text data 314. Indication data describing the drawing gestures made in the general input region are generated by a processor within the drawing pad 302 and are conveyed to the electronic device with which the drawing pad is connected. The electronic device receiving the indication data representing the drawing gestures is able to process that data to perform the functions indicated by the user's input represented by those drawing gestures.

In the illustrated example, the user has drawn a box 316 around the graphic drawing 312. The upper left corner of the box also has a fill gesture 318, which is a filled in triangle formed in that corner. In this example, the filled in triangle fill gesture 318 is a defined indicator that the contents of a box with this fill gesture 318 in one corner is to be preserved as free-form graphics. In some examples, the text data 314 is processed to obtain machine codes for recognized characters within the text data 314.

In one example, indication data is generated for all of the data entered on the touch sensitive input region 304 and sent to the electronic device to which it is connected. In that example, the receiving electronic device includes configuration data that specifies the location of indicated input regions, such as the first indicated input region 306 and the second indicated input region 308. The receiving electronic device in that example processes the indication data that describes all of the drawing gestures made by the user, and the processing within the receiving electronic device determines which drawing gestures were made in indicated input regions, and which were made in general input regions. In further examples, processing within the drawing pad 302 is able to provide indication data that also include indications of indicated input regions in which particular drawing gestures were made. In such an example, the indication data for those particular drawing gestures is associated with the indication of the indicated input region in which that particular drawing gesture was made.

In an example, the drawing pad 302 accumulates drawing gestures and does not send any data to the electronic device until the user indicates the entered data is complete. In an example, the user indicates that data entry is complete by activating a user input element. The "send" button 322 and the "erase" button 320 are examples of user input elements that a user can activate to complete or reset, respectively, input on the touch sensitive input region 304. Once the user has entered drawing gestures for the desired action, the user is able to press a "send" button 322. In response to pressing the send button 322, indication data corresponding to the accumulated sequence of drawing gestures are output to the electronic device to which the drawing pad is connected. In one example, the user entered drawing gestures are cleared from the touch sensitive input region 304 once the send button 322 is pressed. If a user has made an error in entering drawing gestures on the touch sensitive input region 304, the user is able to press the "erase" button 320. The erase button 320 will clear all drawing gestures and all input will be lost. In one example, a sequence of input data corresponding to the drawing gestures that occurring since a previous activation of the user input element is generated, and a sequence of indication data is output.

FIG. 4 illustrates a drawing pad entered electronic device configuration command 400, in accordance with one example. The drawing pad entered electronic device configuration command 400 depicts a hand written "Vibrate On" command 406 written onto the touch sensitive input region 404 of the drawing pad 402. The user has also entered a fill gesture 408 of a triangle in the lower right corner of the touch sensitive input region 404. In an example, the fill gesture 408 of a triangle in the lower right corner of the touch sensitive input region 404 indicates that the drawing gesture is to be interpreted as an electronic device configuration command. In response to pressing the "send" button 422, the drawing pad 402 sends indication data corresponding to the drawing gestures on the touch sensitive input region 404. In turn, the electronic device receiving that indication data interprets the drawing gestures to determine how to proceed. Upon recognizing the fill gesture 408, the processing recognizes that the other drawing gestures are device configuration commands and responds according to their interpretation. Drawing gestures made on the touch sensitive input region 504 are able to be cleared by pressing the erase button 420.

Figure 5:
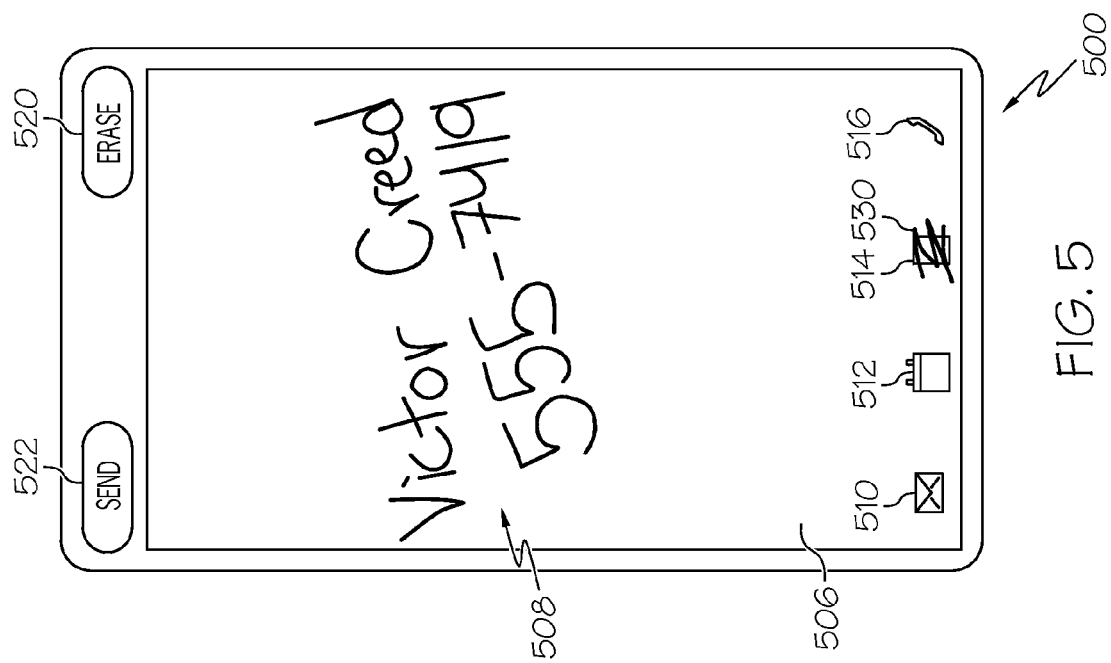
FIG. 5 illustrates an address book drawing pad display and entry, in accordance with one example.

FIG. 5 illustrates an address book drawing pad display and entry 500, in accordance with one example. The address book drawing pad display and entry 500 depicts a touch sensitive input region 504 on which is displayed a number of command icons 506. An e-mail icon 510, a calendar icon 512, a contact icon 514 and a call icon 516 are shown. A user is able to select one of the command icons by making a fill gesture 530 over the desired icon. As shown, a user has made a fill gesture 530 over the contact icon 514, indicating that the data on the remainder of the touch sensitive input region 504 is to be entered as contact data. The user has entered a person's name and telephone number 508 in the general input region of the touch sensitive input region 504, and this data will be processed by the electronic device as contact data to enter into a contact manager application as a result of processing that recognizes the fill gesture 530 made over the contact icon 514. The user is able to have indication data corresponding to the drawing gestures sent to the electronic device by pressing the send button 522. Drawing gestures made on the touch sensitive input region 504 are able to be cleared by pressing the erase button 520.

Figure 6:
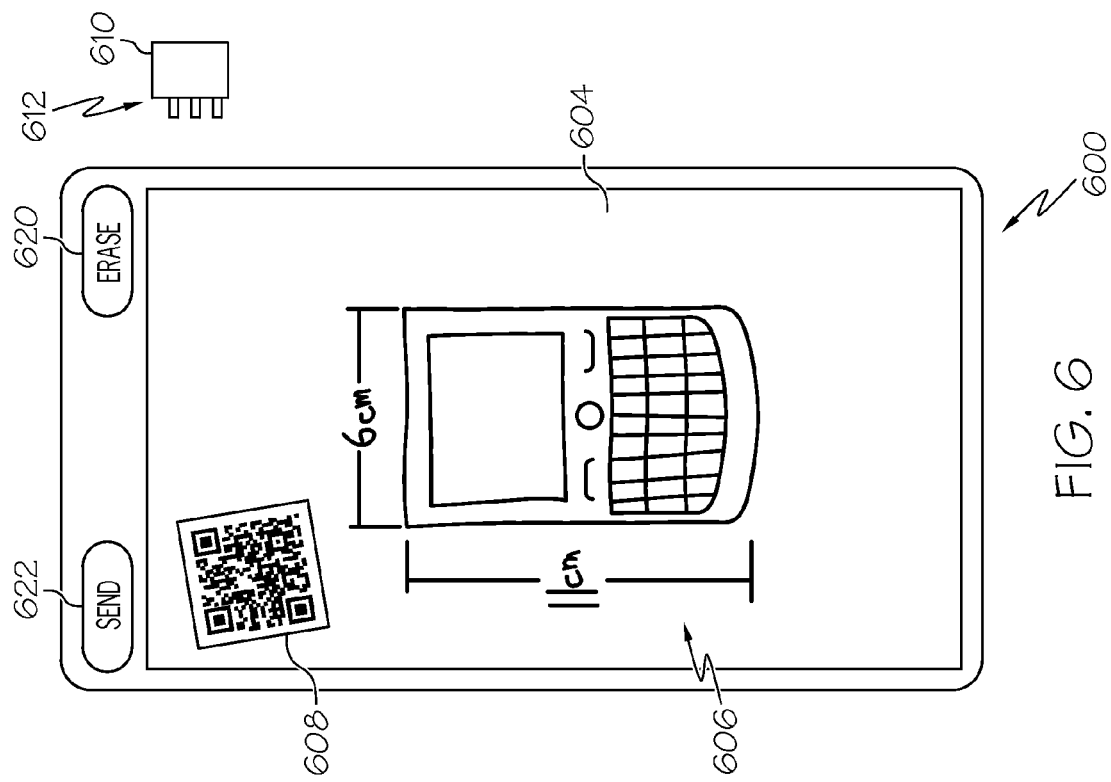
FIG. 6 illustrates a drawing pad stamp input, in accordance with one example.

FIG. 6 illustrates a drawing pad stamp input 600, in accordance with one example. The drawing pad stamp input 600 depicts a drawing pad 602 onto which a user has impressed a stamp 608 onto the touch sensitive input region 604. A graphic 606 has also been drawn. The stamp 608 is an input made by, for example, an object 610 with a defined pattern 612 formed on one end. A user is able to press the end of the object 610 with the defined pattern 612 onto the touch sensitive input region 604 in order to create a defined drawing gesture, referred to herein as a stamp gesture, in the form of stamp 608.

In this example, the stamp is used to input a consistent and distinct symbol to the touch sensitive input region 604, such as the illustrated QR code. These easily recognizable symbols are detected by processing within the electronic device receiving the indication data corresponding to these drawing gestures. In one example, the receiving electronic device is able to perform specific functions corresponding to the stamp. In one example, the stamp 608 corresponds to a particular project that the user is working on. The user makes a sketch of an object and tags the drawing by using the stamp. When this sketch is sent to the electronic device, processing within the electronic device is able to identify the stamp and associate the sketch with that project.

Drawing gestures made on the touch sensitive input region 604 are able to be cleared by pressing the erase button 620. The indication data corresponding to gestures made on the touch sensitive input region 604 are sent to the electronic device in response to pressing the send button 622.

Figure 7:
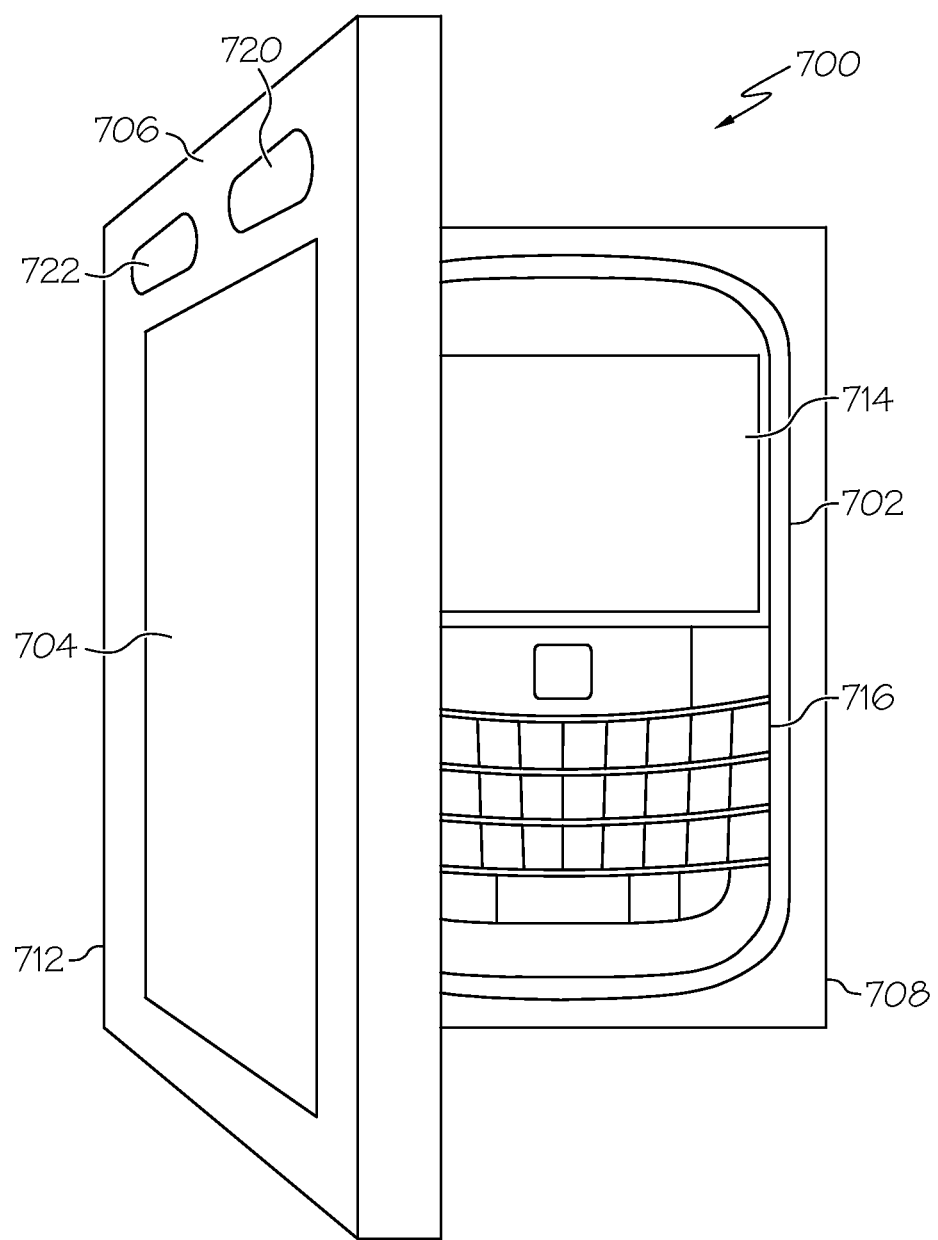
FIG. 7 illustrates a drawing pad flap case, in accordance with one example.

FIG. 7 illustrates a drawing pad flap case 700, in accordance with one example. The drawing pad flap case 700 is a protective carrying case for an electronic device 710 that has a flap that consists off a drawing pad 706. In the example drawing pad flap case 700, a case body 708 defines a case compartment around five sides of the electronic device 702. In this example, the case body defines the case compartment around the four side edges of the electronic device 710 and the back of the electronic device 710. The case body 708 in this example has an opening in its front side that allows the electronic device 710 to be inserted into and withdrawn from the case body 708. In some example, the electronic device 710 has one or more of a display screen 714, a keypad 716 with user function keys, and other components. The illustrated opening exposes the entire front of the electronic device 710 and provides the user with visual and physical access to the components on the front of the electronic device.

The drawing pad flap case 700 has a drawing pad 706 that is attached to the case body 708 along a case hinge 712. The drawing pad 706, operating in combination with the case hinge 712, forms a flap portion of the case compartment that is moveable between an open position and a closed position. In order to more clearly illustrate aspects of the drawing pad flap case 700, the illustrated drawing pad 706 is in a partially open position that is between fully open and fully closed. When the drawing pad 706 is in the fully closed position, it is a flap portion of the case compartment that covers the opening of the case body 708, protects the front of the electronic device 710, and prevents the electronic device 710 from being removed or falling out of the case compartment.

The drawing pad 706 is movable by rotating about the case hinge 712 from the closed position to the open position. In the open position, the user has access to the front of the electronic device 710, including access to components mounted on the front of the electronic device 710, such as a display screen 714 and the keypad 716. When the drawing pad 706 is in the open position, the electronic device 710 is able to be removed from or inserted into the case compartment.

The drawing pad 706 in this example has a touch sensitive input region 704 that allows a user to enter drawing gestures on the drawing pad 706. As discussed above, the drawing pad 706 in one example is communicatively coupled to the electronic device 710 by either a wired or wireless data communications connection. The drawing pad 706 sends to the electronic device 710 indication data corresponding to drawing gestures that a user makes on the touch sensitive input region 704. The indication data is sent through one or more of the wired or wireless data communications connections that are available in a particular scenario. The drawing pad flap case 700 provides added convenience to a user by allowing the user to make drawing gestures, as are discussed above with regards to FIGS. 3-6, on the drawing pad 706 while the drawing pad is in the closed position and thereby protecting the components on the front of the electronic device 710.

Figure 8:
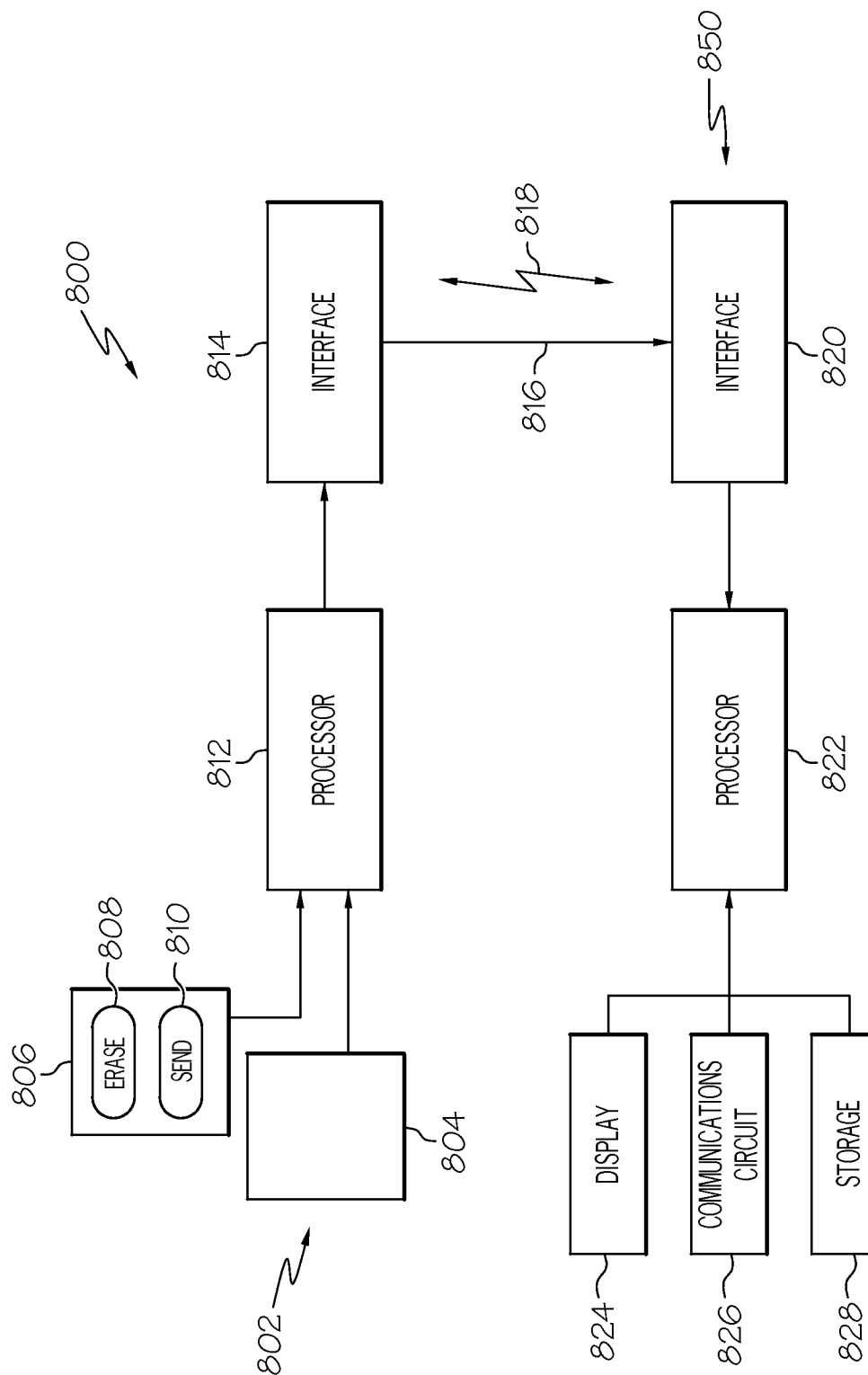
FIG. 8 illustrates a drawing pad and electronic device component diagram, according to one example.

FIG. 8 illustrates a drawing pad and electronic device component diagram 800, according to one example. The drawing pad and electronic device component diagram 800 is a block diagram illustrating the operating components of the devices described above that allow a user to enter data, commands, other information, or combinations of these, on a drawing pad that are processed by an electronic device. The following refers to the devices described above with regards to FIG. 1 and incorporates references to the devices portrayed therein.

The drawing pad and electronic device component diagram 800 illustrates components within a drawing pad 802 and an electronic device 850. The drawing pad 802 is similar to the drawing pad 104 described above, and the electronic device 850 is similar to the electronic device 112, also described above. The drawing pad 802 has a touch sensitive input region 804 that allows a user to make drawing gestures thereon. The drawing pad 802 further includes user input elements 806 in the form of two buttons, a send button 810 and an erase button 808. The operation of the send button 810 and the erase button 808 are described above.

The touch sensitive input region 804 operates to detect touching of its surface and produces outputs that correspond to the location at which the touch sensitive input region 804 is touched. In various examples, a user is able to draw a line or other curvilinear shape on the touch sensitive input region 804 and a representation of that drawn shape is captured.

The drawing pad 802 further includes a processor 812. The processor 812 is an example of a touch sensitive input region processor that cooperates with the touch sensitive input region 804 to accept and accumulate representations of the drawing gestures made by a user on the touch sensitive input region 804. The processor 812 in one example further accepts inputs from the user input elements 806, e.g., from the two buttons including the send button 810 and the erase button 808. The processor 812 in one example responds to a pressing the erase button 808 by discarding the accumulated representations of drawing gestures that a user has made. The processor 812 responds to a user's pressing of the send button 810 by generating a sequence of indication data that correspond to the drawing gestures made on the touch sensitive input region 804, and outputs that sequence of indication data as is described below.

The processor 812 receives input data from the drawing pad 802 that corresponds to gestures made thereon and recognizes data, commands, or both that is represented by those gestures. The processor 812 generates a sequence of indication data representing one or more of the gestures, the data or commands, or combinations thereof. The processor 812 outputs the sequence of indication data in one example to an interface 814. The interface 814 is an electrical data interface that connects the drawing pad 802 to the electronic device 850. The interface 814 is able to establish and maintain at least one of a wired link 816 and a wireless link 818 between the drawing pad and the electronic device 850.

The electronic device 850 has an interface 820 that corresponds to the interface 814 of the drawing pad. The interface 820 of the electronic device similarly operates to establish and maintain at least one of a wired link 816 and a wireless link 818 between the electronic device 850 and the drawing pad 802. These communications links, i.e., the wired link 816 and the wireless link 818 convey, for example, indication data that represents drawing gestures made on the touch sensitive input region 804. These indication data are able to represent the drawing gestures as, for example, vector information describing curvilinear shapes drawn on the touch sensitive input region 804, raster data indicating locations of individual dots that comprise the shapes drawn on the touch sensitive input region 804, or by any encoding or representation technique.

The interface 820 in one example provides the indication data received from the drawing pad to an external processor 822. The external processor 822 in one example is within the electronic device 850 but is external to the drawing pad 802. The external processor 822 processes the indication data that represents drawing gestures made on the touch sensitive input region to determine data or commands indicated by those drawing gestures. The external processor 822 in one example processes indication data that represent the drawings described above in FIGS. 3-6 to identify the data and commands associated with those drawings. For example, the processor is able to alter a configuration of the electronic device 850 in response to receiving indication data corresponding to the drawing depicted in drawing pad entered electronic device configuration command 400 described above with regards to FIG. 4.

The external processor 822 is able to provide data to a number of components in response to receiving and processing indication data from the drawing pad 802. The external processor 822 is able to provide visual data to be presented on a display 824. The processor is able to produce data that is to be communicated to external destinations through a communications system 826. The communications system 826 is able to send, for example, e-mails or other messaging data packets to external destinations in response to the drawing pad with indicated input regions 300 described above with regards to FIG. 3.

The external processor 822 is able to store data in a storage 828. For example, the external processor 822 is able to respond to indication data representing the drawing depicted in the address book drawing pad display and entry 500 by storing that personal contact information in a contact management storage maintained in the storage 828. The external processor 822 is also able to recognize stamp gestures as discussed above with regards to FIG. 6, and store drawings into the storage 828 in association with an identifier associated with the stamp 608.

Figure 9:
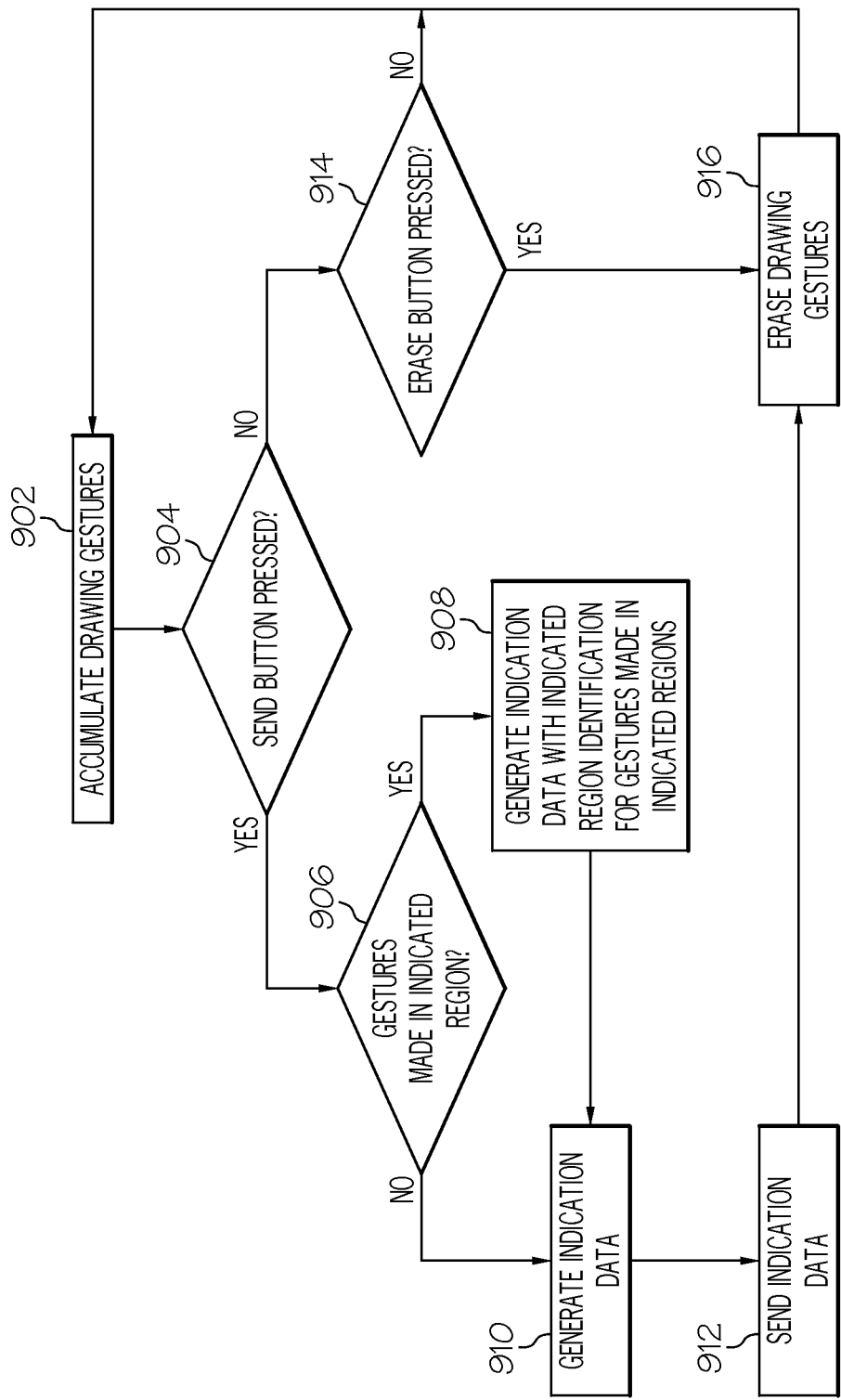

FIG. 9 illustrates a drawing pad processing flow 900, in accordance with one example. The drawing pad processing flow 900 is able to be performed by the processor 812, discussed above with regards to FIG. 8, that is part of a drawing pad 802. The drawing pad processing flow 900 begins by accumulating, at 902, drawing gestures. As discussed above, drawing gestures are able to be accumulated to describe a drawing made by a user on a touch sensitive input region 804.

In some examples, the processor 812 of the drawing pad 802 identifies if gestures are made in one of the indicated input regions. Examples of indicated input regions are described above with regards to FIG. 3. In general, indicated input regions are regions of the touch sensitive input region 804 that have particular functions associated with them, and gestures made within those indicated input regions are processed differently than input made in a general input region. In one example, the processor 812 identifies which drawing gestures are made in indicated input regions when the user completes making drawing gestures and presses the send button 810. In further examples, the processor 812 in the drawing pad does not identify drawing gestures made in indicated input regions. In such examples, the receiving processor, such as the processor in the electronic device 850, identifies which gestures are located in indicated input regions.

The drawing pad processing flow 900 continues by determining, at 904, if the "send" button 810 has been pressed. If it is determined that the send button 810 has been pressed, in examples where the processor 812 of the drawing pad 802 identifies gestures made in indicated input regions, the drawing pad processing flow 900 continues by determining, at 906, if any drawing gestures were made in an indicated input region. If drawing gestures were determined to have been made in an indicated input region, the processing continues by generating, at 908, indication data for drawing gestures that were made in indicated input regions and also includes in that indication data an indication of the indicated input region in which the drawing gesture was made.

In some examples, the process recognizes fill gestures that are within the drawing gestures. Fill gestures are described above and are used to signify particular inputs by a user. Fill gestures are able to be made in indicated input regions. In some examples, recognizing fill gestures within drawing gestures made within indicated input regions results in the generation of indication data that includes an indication data corresponding to the drawing gesture and an indication of the indicated input region in which the fill gesture was made.

After determining that a drawing gesture was not made in an indicated input region, or after generating indication for drawing gestures that were made in indicated input regions, the drawing pad processing flow 900 continues by generating, at 910, indication data for drawing gestures that were not made in indicated drawing regions. The indication data that represents the accumulated drawing gestures is then sent, at 912, through the interface 814. The drawing pad processing flow 900 then continues by erasing, at 916, the accumulated gesture information to allow new drawings to be captured.

If it is determined that the send button 810 has not been pressed, the drawing pad processing flow 900 continues by determining, at 914, if the "erase" button 810 has been pressed. If it is determined that the erase button 810 has been pressed, the drawing pad processing flow 900 proceeds to erase, at 916, the accumulated gesture information to allow new drawings to be captured. After erasing the accumulated gesture information, or if it is determined that the erase button 808 has not been pressed, the drawing pad processing flow 900 returns to accumulating gestures, at 902.

As is clear from the above described processing performed by the drawing pad processing flow 900, drawing gestures are accumulated, at 902, since a previous activation of a user input element, such as the send button 810 or the erase button 808. These accumulated gestures in this example result in the generation, at 908 or 910, of indication data corresponding to that sequence of gestures that is output in response to a present activation of a user input element, such as the send button 810. In one example, a processor performing the drawing pad processing flow 900 accumulates gestures by receiving input data from an input device, such as from the touch sensitive input region 804, that represents drawing gestures made thereon.

Figure 10:
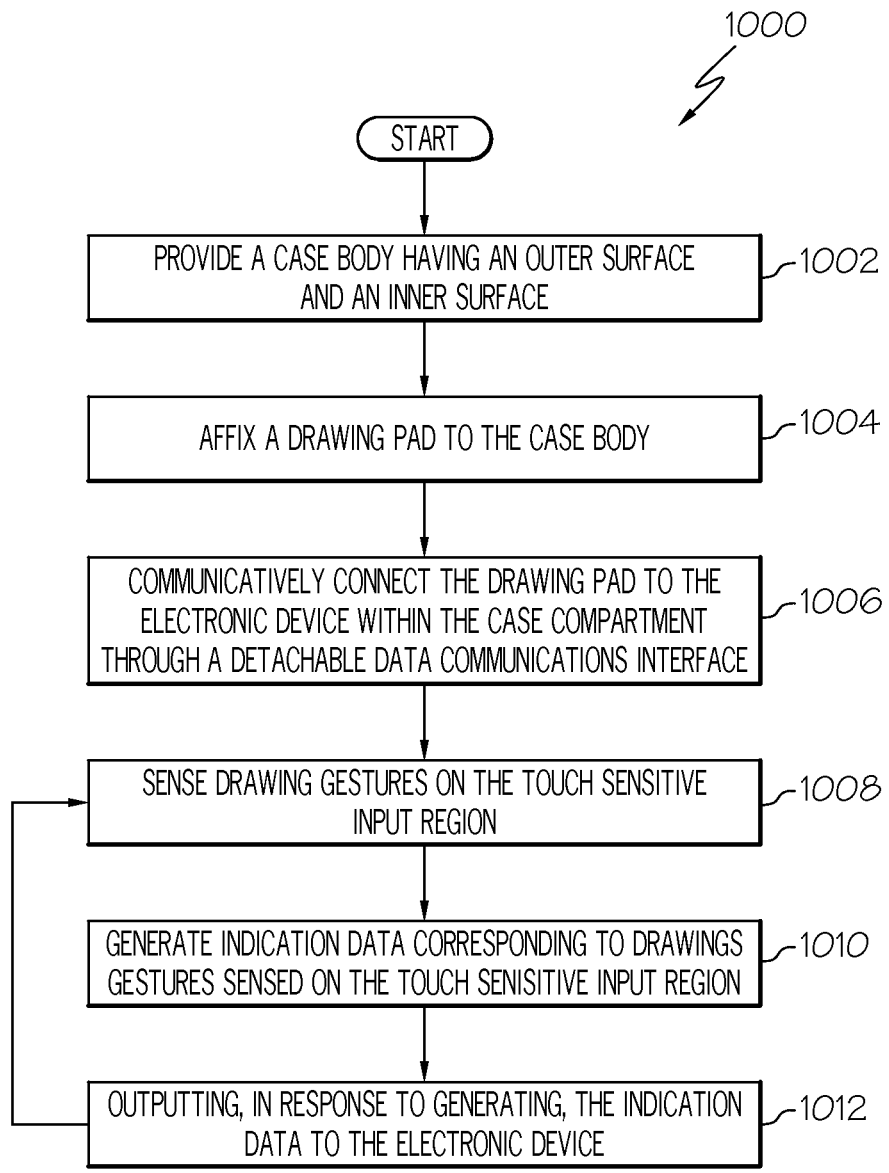
FIG. 10 illustrates a method for accepting handwritten input on an electronic device, according to one example.

FIG. 10 illustrates a method for accepting handwritten input on an electronic device 1000, according to one example. The method begins by providing, at 1002, a case body. The case body has an outer surface and an inner surface where the inner surface defines at least part of a case compartment that removably receive an electronic device. The method continues by affixing, at 1004, a drawing pad to the case body. In one example, the drawing pad has a touch sensitive input region. The drawing pad is then communicatively connected, at 1006, to the electronic device within the case compartment through a detachable data communications interface. As discussed above, the detachable communications interface is able to provide one or more of a wired data communications link or a wireless data communications link. As described above, the drawing pad is connected to an electronic device that is within a case compartment of a case body, where the case body has an outer surface and an inner surface. The inner surface of the case body defines at least part of the case compartment within which the electronic device is located. The case compartment is also configured to removably receive the electronic device.

The method continues by sensing, at 1008, drawing gestures on the touch sensitive input region. The drawing pad in one example is affixed to the case body with the case compartment in which the electronic device is located. In response to sensing the gestures on the touch sensitive input region, indication data corresponding to drawing gestures sensed on the touch sensitive input region is generated, at 1010. In response to generating the indication data, the indication data is output, at 1012, to the electronic device. The process then returns to sensing drawing gestures, at 1008.

Figure 11:
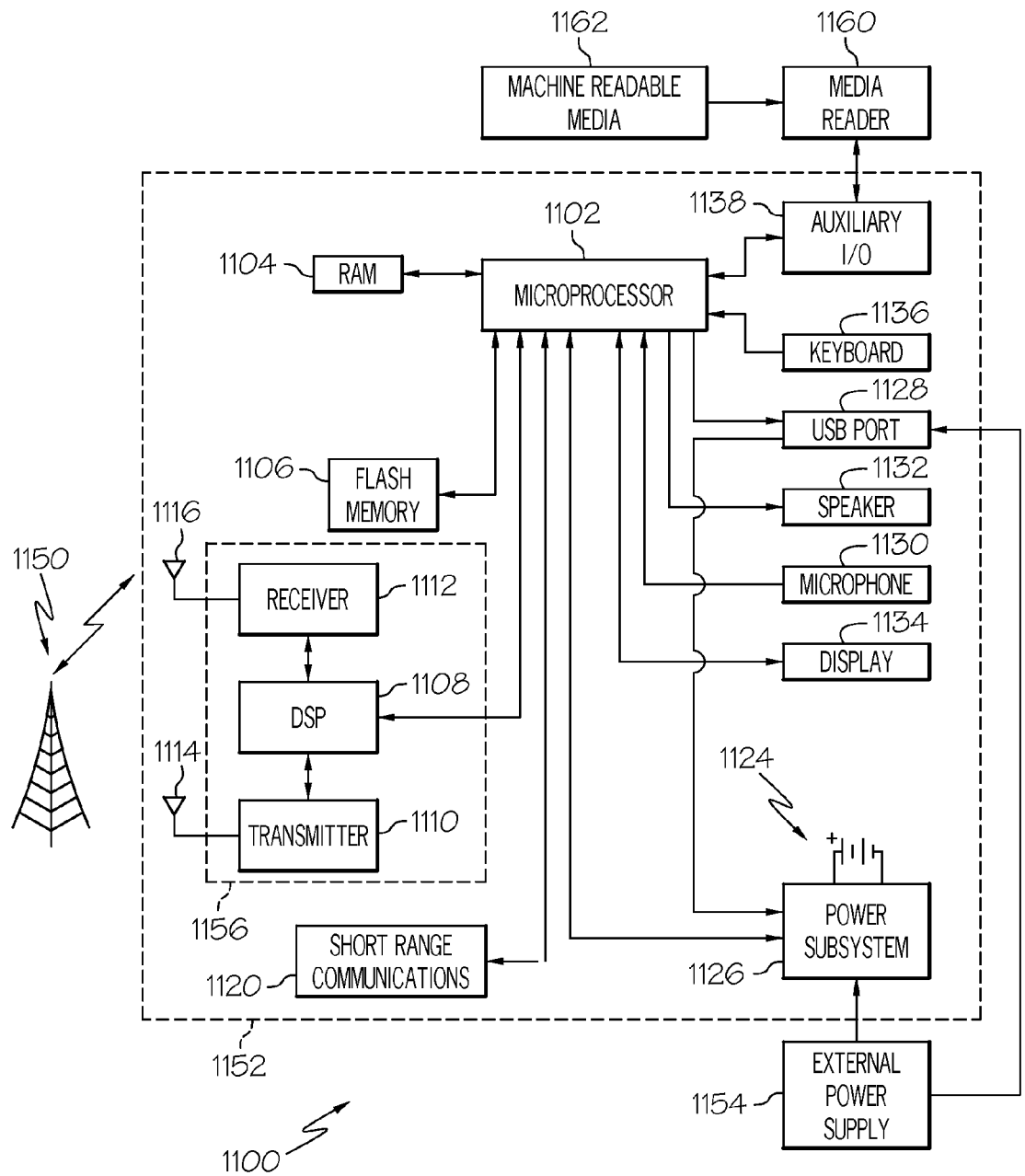
FIG. 11 is a block diagram of an electronic device and associated components in which the systems and methods disclosed herein may be implemented.

FIG. 11 is a block diagram of an electronic device and associated components 1100 in which the systems and methods disclosed herein may be implemented. In this example, an electronic device 1152 is a wireless two-way communication device with voice and data communication capabilities, such as the example electronic device 112. Such electronic devices communicate with a wireless voice or data network 1150 using a suitable wireless communications protocol. Wireless voice communications are performed using either an analog or digital wireless communication channel. Data communications allow the electronic device 1152 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 1152 is an example electronic device that includes two-way wireless communications functions. Such electronic devices incorporate a communication subsystem 1156 that includes elements such as a wireless transmitter 1110, a wireless receiver 1112, and associated components such as one or more antenna elements 1114 and 1116. A digital signal processor (DSP) 1108 performs processing to extract data from received wireless signals and to generate signals to be transmitted. The particular design of the communication subsystem 1156 is dependent upon the communication network and associated wireless communications protocols with which the device is intended to operate.

The electronic device 1152 includes a microprocessor 1102 that controls the overall operation of the electronic device 1152. The microprocessor 1102 interacts with the above described communications subsystem elements and also interacts with other device subsystems such as flash memory 1106, random access memory (RAM) 1104, auxiliary input/output (I/O) device 1138, universal serial bus (USB) Port 1128, display 1134, keyboard 1136, speaker 1132, microphone 1130, a short-range communications subsystem 1120, a power subsystem and charging controller 1126, and any other device subsystems.

Microprocessor 1102 in one example receives and processes indication data that corresponds to drawing gestures that a user makes on a drawing pad, as is described above. The microprocessor 1102 is able to interpret the indication data according to various techniques, including character recognition, fill gesture recognition, graphical data compression using various techniques, and the like. Based upon interpretation of the indication data and their associated drawing gestures, the microprocessor 1102 is able to extract configuration commands for the electronic device 1152, extract text and information to create e-mails or other messages to be sent by the communications subsystem 1156, extract information to store in the electronic device 1152, such as personal contact data, or extract text or graphical data for other purposes.

A power pack 1124 is connected to a power subsystem and charging controller 1126 as is described in detail above. The power pack 1124 provides power to the circuits of the electronic device 1152. The power subsystem and charging controller 1126 includes power distribution circuitry for providing power to the electronic device 1152 and also contains power pack charging controller circuitry to manage recharging the power pack 1124. The power subsystem and charging controller 1126 receives power from an external power supply 1154 that is connected through a power connector of the electronic device 1152 or through the USB port 1128.

The USB port 1128 provides data communication between the electronic device 1152 and one or more external devices. Data communication through USB port 1128 enables a user to set preferences through the external device or through a software application and extends the capabilities of the device by enabling information or software exchange through direct connections between the electronic device 1152 and external data sources rather than through a wireless data communication network.

Operating system software used by the microprocessor 1102 is stored in flash memory 1106. Further examples are able to use a power pack backed-up RAM or other non-volatile storage data elements to store operating systems, other executable programs, or both. The operating system software, device application software, or parts thereof, are able to be temporarily loaded into volatile data storage such as RAM 1104. Data received via wireless communication signals or through wired communications are also able to be stored to RAM 1104.

The microprocessor 1102, in addition to its operating system functions, is able to execute software applications on the electronic device 1152. A predetermined set of applications that control basic device operations, including at least data and voice communication applications, is able to be installed on the electronic device 1152 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 1152 through, for example, the wireless network 1150, an auxiliary I/O device 1138, USB port 1128, short-range communications subsystem 1120, or any combination of these interfaces. Such applications are then able to be installed by a user in the RAM 1104 or a non-volatile store for execution by the microprocessor 1102.

In a data communication mode, a received signal such as a text message or web page download is processed by the communication subsystem, including wireless receiver 1112 and wireless transmitter 1110, and communicated data is provided the microprocessor 1102, which is able to further process the received data for output to the display 1134, or alternatively, to an auxiliary I/O device 1138 or the USB port 1128. A user of the electronic device 1152 may also compose data items, such as e-mail messages, using the keyboard 1136, which is able to include a complete alphanumeric keyboard or a telephone-type keypad, in conjunction with the display 1134 and possibly an auxiliary I/O device 1138. Such composed items are then able to be transmitted over a communication network through the communication subsystem.

For voice communications, overall operation of the electronic device 1152 is substantially similar, except that received signals are generally provided to a speaker 1132 and signals for transmission are generally produced by a microphone 1130. Alternative voice or audio I/O subsystems, such as a voice message recording subsystem, may also be implemented on the electronic device 1152. Although voice or audio signal output is generally accomplished primarily through the speaker 1132, the display 1134 may also be used to provide an indication of the identity of a calling party, the duration of a voice call, or other voice call related information, for example.

Depending on conditions or statuses of the electronic device 1152, one or more particular functions associated with a subsystem circuit may be disabled, or an entire subsystem circuit may be disabled. For example, if the power pack temperature is high, then voice functions may be disabled, but data communications, such as e-mail, may still be enabled over the communication subsystem.

A short-range communications subsystem 1120 is a further optional component which may provide for communication between the electronic device 1152 and different systems or devices, which need not necessarily be similar devices. For example, the short-range communications subsystem 1120 may include an infrared device and associated circuits and components or a Radio Frequency based communication module such as one supporting Bluetooth® communications, to provide for communication with similarly-enabled systems and devices. In one example, the short range communications system 1120 implements a wireless communications link to a drawing pad, such as the wireless communications link 818 between the drawing pad 802 and electronic device 860 as are described with regards to FIG. 8.

A media reader 1160 is able to be connected to an auxiliary I/O device 1138 to allow, for example, loading computer readable program code of a computer program product into the electronic device 1152 for storage into flash memory 1106. One example of a media reader 1160 is an optical drive such as a CD/DVD drive, which may be used to store data to and read data from a computer readable medium or storage product such as computer readable storage media 1162. Examples of suitable computer readable storage media include optical storage media such as a CD or DVD, magnetic media, or any other suitable data storage device. Media reader 1160 is alternatively able to be connected to the electronic device through the USB port 1128 or computer readable program code is alternatively able to be provided to the electronic device 1152 through the wireless network 1150.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A cover for an electronic device, comprising:
 a case body having an outer surface and an inner surface, the case body defining a case compartment around five sides of an electronic device, the case body defining an opening exposing a front of the electronic device the case body being configured to removably receive an electronic device through the opening; and
 a flap portion defined by a drawing pad, the drawing pad being attached to the case body along a case hinge and forming the flap portion that is movable between an open position and a closed position, the flap portion completely covering the opening when in the closed position,
 the drawing pad comprising a touch sensitive input region and a detachable data communications interface,
  the touch sensitive input region configured to sense drawing gestures thereon,
  the detachable data communications interface configured to detachably connect a communications link to the electronic device within the case compartment, the communications link conveying indication data to the electronic device, the indication data corresponding to the drawing gestures.

2. The cover of claim 1, wherein the drawing pad comprises at least one indicated input region, each at least one indicated input region comprising a part of the touch sensitive input region that is smaller than the touch sensitive input region,
 wherein indication data corresponding to drawing gestures sensed within a respective indicated input region further comprises an indication of the respective indicated input region.

3. The cover of claim 1, wherein the drawing pad comprises at least one indicated input region, each at least one indicated input region comprising a part of the touch sensitive input region that is smaller than the touch sensitive input region,
 wherein indication data corresponding to a fill gesture sensed within a respective indicated input region further comprises an indication of the respective indicated input region.

4. The cover of claim 1, the drawing pad further comprising:
 a processor, coupled to the touch sensitive input region, the processor configured to:
  receive input data corresponding to the drawing gestures; and
  generate, in response to receipt of the input data, the indication data corresponding to the drawing gestures.

5. The cover of claim 4, further comprising an user input element, the user input element configured to be activated by a user, and
 wherein the processor is further configured to:
  accumulate at least one drawing gesture occurring since a previous activation of the user input element;
  generate, in response to an accumulation of the at least one drawing gesture, a sequence of indication data corresponding to the at least one drawing gesture; and
  output the sequence of indication data in response to a present activation of the user input element, the present activation of the user input element occurring after the previous activation.

6. A protective carrying case for an electronic device, comprising:
 a case body having an outer surface and an inner surface, the case body defining a case compartment around five sides of an electronic device, the case body defining an opening exposing a front of the electronic device the case body being configured to removably receive an electronic device through the opening; and
 a flap portion defined by a drawing pad, the drawing pad being attached to the case body along a case hinge and forming the flap portion that is movable between an open position and a closed position, the flap portion completely covering the opening when in the closed position,
 the drawing pad comprising a touch sensitive input region and a detachable data communications interface,
  the touch sensitive input region configured to sense drawing gestures thereon,
  the detachable data communications interface configured to detachably connect a communications link to the electronic device within the case compartment, the communications link conveying indication data to the electronic device, the indication data corresponding to the drawing gestures.

7. The protective carrying case of claim 6, wherein the drawing pad comprises at least one indicated input region, each at least one indicated input region comprising a part of the touch sensitive input region that is smaller than the touch sensitive input region,
 wherein indication data corresponding to drawing gestures sensed within a respective indicated input region further comprises an indication of the respective indicated input region.

8. The protective carrying case of claim 6, wherein the drawing pad comprises at least one indicated input region, each at least one indicated input region comprising a part of the touch sensitive input region that is smaller than the touch sensitive input region,
 wherein indication data corresponding to a fill gesture sensed within a respective indicated input region further comprises an indication of the respective indicated input region.

9. The protective carrying case of claim 6, the drawing pad further comprising:
 a processor, coupled to the touch sensitive input region, the processor configured to:
  receive input data corresponding to the drawing gestures; and
  generate, in response to receipt of the input data, the indication data corresponding to the drawing gestures.

10. The protective carrying case of claim 9, further comprising an user input element, the user input element configured to be activated by a user, and
 wherein the processor is further configured to:
  accumulate at least one drawing gesture occurring since a previous activation of the user input element;
  generate, in response to an accumulation of the at least one drawing gesture, a sequence of indication data corresponding to the at least one drawing gesture; and
  output the sequence of indication data in response to a present activation of the user input element, the present activation of the user input element occurring after the previous activation.

11. A method for accepting handwritten input on an electronic device, the method comprising:
 communicatively connecting, through a detachable data communications interface, a drawing pad to an electronic device within a case compartment of a case body having an outer surface and an inner surface, the case body defining a case compartment around five sides of an electronic device, the case body defining an opening exposing a front of the electronic device the case body being configured to removably receive an electronic device through the opening;
 sensing drawing gestures on a touch sensitive input region of a drawing pad, wherein the drawing pad defines a flap portion attached to the case body along a case hinge and forming the flap portion that is movable between an open position and a closed position, the flap portion completely covering the opening when in the closed position;
 generating, in response to sensing the gestures on the touch sensitive input region, indication data corresponding to drawing gestures sensed on the touch sensitive input region; and
 outputting, in response to generating, the indication data to the electronic device.

12. The method of claim 11, wherein the sensing drawing gestures further comprises:
 sensing an indicated drawing gesture sensed within at least one indicated input region of the drawing pad, and
 wherein generating indication data further comprises generating indication data corresponding to the drawing gesture and an indication of the respective indicated input region.

13. The method of claim 11, wherein the drawing pad comprises at least one indicated input region, each at least one indicated input region comprising a part of the touch sensitive input region that is smaller than the touch sensitive input region,
 wherein generating indication data further comprises generating, in response to recognizing a fill gesture within the drawing gesture, indication data corresponding to the drawing gesture and an indication of the respective indicated input region.

14. The method of claim 11, wherein the drawing pad further comprising an user input element, the user input element configured to be activated by a user, and
 wherein the method further comprises:
  accumulating at least one drawing gesture occurring since a previous activation of the user input element;
  generating, in response to accumulating the at least one drawing gesture, a sequence of indication data corresponding to the at least one drawing gesture;
  detecting a user activation of the user input element; and
  outputting, in response to a present activation of the user input element, the sequence of indication data, wherein the present activation of the user input element occurs after the previous activation.

15. An electronic device with drawing pad cover, comprising:
- an electronic device, comprising a processor configured to:
  - receive indication data representing drawing gestures;
  - determine, based on the indication data, one of data and commands associated with the drawing gestures; and
  - perform a function based on the one of data and commands;
- a case body having an outer surface and an inner surface, the case body defining a case compartment around five sides of an electronic device, the case body defining an opening exposing a front of the electronic device the case body being configured to removably receive an electronic device through the opening; and
- a flap portion defined by a drawing pad, the drawing pad being attached to the case body along a case hinge and forming the flap portion that is movable between an open position and a closed position, the flap portion completely covering the opening when in the closed position,
- the drawing pad comprising a touch sensitive input region and a detachable data communications interface,
  - the touch sensitive input region configured to sense drawing gestures thereon,
  - a touch sensitive input region processor, coupled to the touch sensitive input region, configured to produce indication data corresponding to the drawing gestures; and
  - the detachable data communications interface, coupled to the touch sensitive input region processor, configured to detachably connect a communications link to the electronic device within the case compartment, the communications link conveying indication data to the electronic device, the indication data corresponding to the drawing gestures.

16. The electronic device with drawing pad cover of claim 15, wherein the drawing pad comprises at least one indicated input region, each at least one indicated input region comprising a part of the touch sensitive input region that is smaller than the touch sensitive input region,
- wherein indication data corresponding to drawing gestures sensed within a respective indicated input region further comprises an indication of the respective indicated input region.

17. The electronic device with drawing pad cover of claim 15, wherein the drawing pad comprises at least one indicated input region, each at least one indicated input region comprising a part of the touch sensitive input region that is smaller than the touch sensitive input region,
- wherein indication data corresponding to a fill gesture sensed within a respective indicated input region further comprises an indication of the respective indicated input region.

18. The cover of claim 1, wherein at least a portion of the touch sensitive input region contains no displayed images,
- wherein the drawing gestures correspond to device configuration commands and are within the portion of the touch sensitive input region containing no displayed images and,
- wherein the drawing pad further comprises a processor, coupled to the touch sensitive input region, the processor configured to:
  - receive input data corresponding to the drawing gestures; and
  - generate, in response to receipt of the input data, device configuration commands corresponding to the drawing gestures.

* * * * *